2 Sheets—Sheet 1.
C. H. McCORMICK.
Reaping Machine.
No. 819.
Reissued Sept. 20, 1859.
Fig. 1
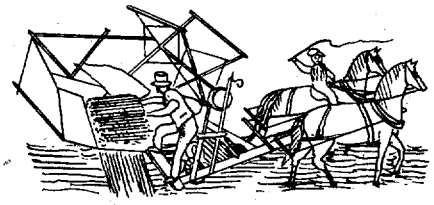
Fig. 2
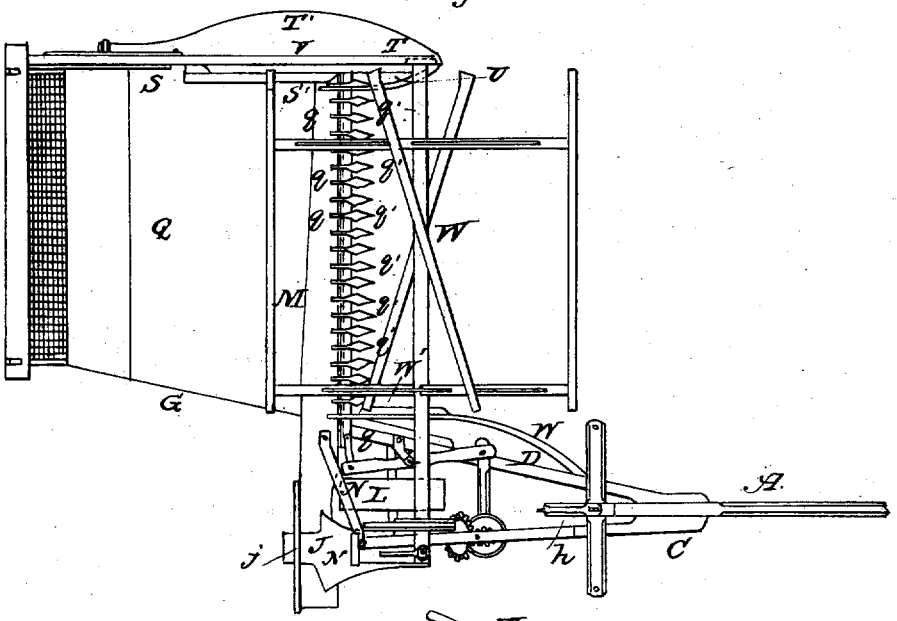
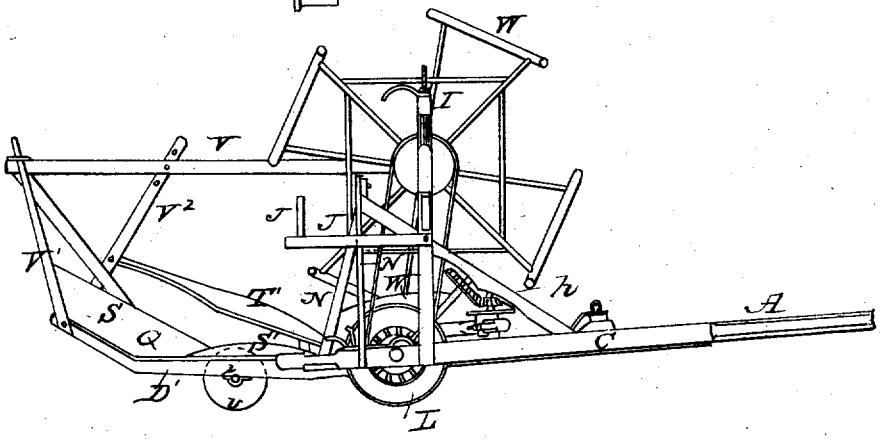
N. PETERS, Photo-Lithographer, Washington, D. C.

2 Sheets—Sheet 2.

C. H. McCORMICK.

Reaping Machine.

No. 819. Reissued Sept. 20, 1859.

N. PETERS. Photo-Lithographer, Washington, D. C.

UNITED STATES PATENT OFFICE.

CYRUS H. McCORMICK, OF CHICAGO, ILLINOIS.

IMPROVEMENT IN REAPING-MACHINES.

Specification forming part of Letters Patent No. 5,335, dated October 23, 1847; Reissue No. 239, dated May 24, 1853; Reissue No. 637, dated December 21, 1858; Reissue No. 819, dated September 20, 1859.

DIVISION D.

*To all whom it may concern:*

Be it known that I, CYRUS H. McCORMICK, of Chicago, in the county of Cook and State of Illinois, have invented a new and useful Improvement in Reaping-Machines, of which the following is a full, clear, and exact description, reference being had to the accompanying drawings, making part of this specification, in which—

Figure 4:
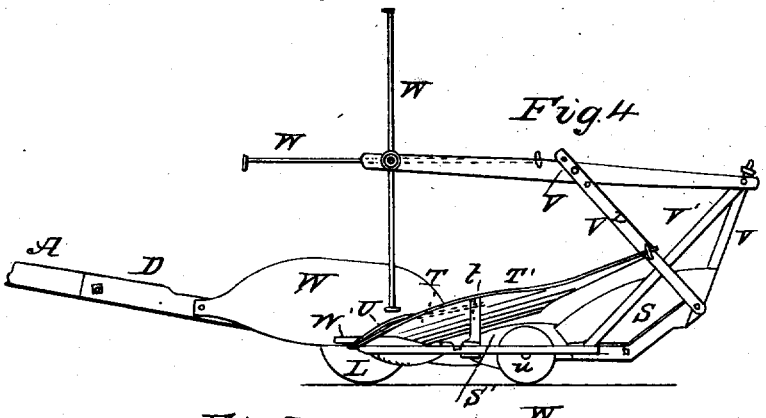
Figure 5:
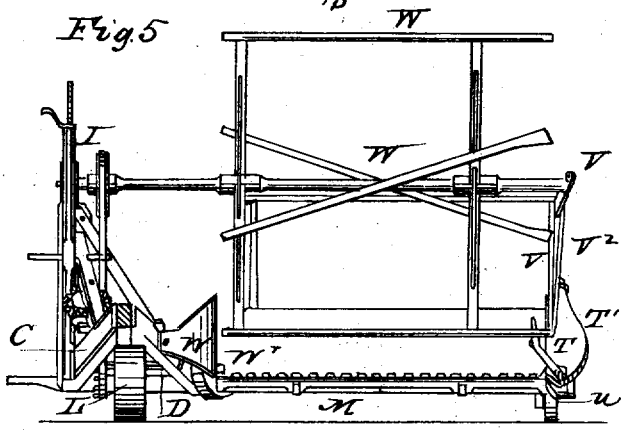
Figure 6:
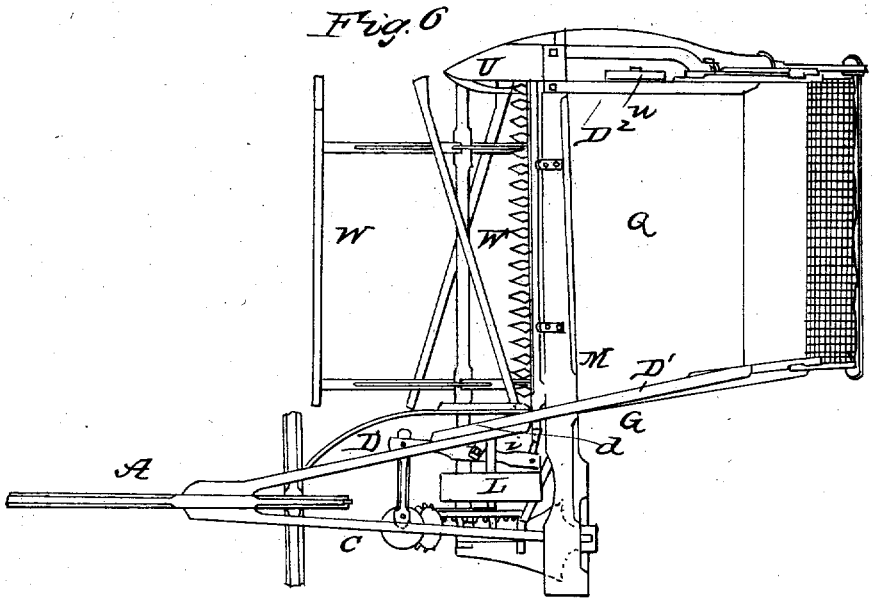

Figure 1 represents in perspective a side-draft-reel reaping-machine embracing my said improvement. Fig. 2 represents a plan of such a machine, as seen from above. Fig. 3 represents an elevation of the inner side of the machine. Fig. 4 represents an elevation of the outer side of the machine. Fig. 5 represents an elevation of the front of the machine, and Fig. 6 represents a view of the under side of the machine.

That side of the machine to which the horses are attached, and which runs next the stubble, I call the "inner" side, and the opposite side of the machine, which runs next the uncut grain, I call the "outer" side of the machine, The improvement claimed under this patent consists of the combination of a divider and a reel co-operating with the divider to divide and separate the grain to be cut from that to be left standing, and to deposit the cut grain on the platform at some distance from the outer side thereof, with a raker's seat or stand so arranged upon the machine as to enable the raker to discharge the grain so divided, cut, and deposited from the platform, and lay it in gavels upon the ground, whereby the raking is facilitated and the efficiency of the machine increased.

In the drawings I have shown this improvement applied to a McCormick reaping-machine, but deem it unnecessary to describe in detail any more of that machine than is needful to a proper understanding of this improvement.

The machine represented in the accompanying drawings consists of a strong frame supported on two wheels, L and *u*, one of which gives motion to the gearing that operates the cutter and the reel. The cutting apparatus is placed in front and the platform Q in rear of the outer portion of the finger-beam M. Above and in front of the platform a reel, W, is placed, which at its outer end is supported by an arm, V, projecting forward from the rear of the frame by which the platform is carried. The inner end of the reel is supported by a post, I, on the inner side of the frame. At the outer end of the finger-beam M a long pointed finger, T, is placed, projecting forward. The office of this finger is to divide the grain to be cut from that to be left standing, and to guide the cut grain at the outer margin of the swath to its place upon the platform. This divider of itself accomplishes two purposes—namely, it separates the grain in the swath about to be cut from the grain to be left standing for the next swath, and it likewise bears the grain at the outer margin of the swath inward, so that when cut it will fall within the line of the outer side of the platform; but as the divider acts mainly against the lower portion of the stalks it often happens that the tops or heads of the inner and outer grain remain entangled above the divider after their lower portions are separated. The reel now comes into action, and by the end of its rib disentangles the heads and sweeps the grain on the inside of the divider toward the cutter, and thence, when cut, upon the platform a little within the outer side thereof. When the cut grain is thus deposited a space is left between it and the outside of the platform for the rake to be inserted and take hold of the grain that is to be raked off.

A seat or stand, J, is provided on the machine for the raker, and it is so placed that he can thence conveniently reach beyond the outer side of the grain on the platform, and, inserting the teeth or fingers of the rake or discharging instrument between the grain and the outside of the platform, he may readily grasp the grain and discharge it from the platform. The divider, the reel, and the raker's seat combined in a proper relation to each other, thus co-operate in facilitating the discharge of the cut grain in the most efficient manner from the platform. To render available to the fullest extent the advantages resulting from the co-operation of the reel and the divider with the raker in gathering the cut grain upon the platform in quantities suitable for sheaves, the seat or stand for the raker should be so arranged as to enable him to discharge the grain with the most convenience and deposit it in gavels in the best position upon the ground with reference to facilitating both the binding of the gavels themselves and the return of the machine to cut the next swath. What that precise position should be will of course depend upon the general plan and organization of the machine. I have shown in the drawings a raker's seat arranged so as to attain these objects in what I conceive to be the best form, by way of example, and this furnishes the requisite data to guide a constructor in the application of this improvement.

What I claim under this patent as my invention is—

The combination of the reel, the divider, and the raker's seat or stand, co-operating together in such manner that the grain deposited upon the platform by the reel and divider may readily be grasped and discharged from the machine by the raker at his seat, substantially as described.

In witness whereof I have hereunto signed my name.

C. H. McCORMICK.

In presence of—
P. H. WATSON,
JOHN S. HOLLINGSHEAD.